US012442504B2

(12) United States Patent
Kloos et al.

(10) Patent No.: US 12,442,504 B2
(45) Date of Patent: Oct. 14, 2025

(54) HEADLAMP FOR A MOTOR VEHICLE

(71) Applicant: Hella GmbH & Co. KGaA, Lippstadt (DE)

(72) Inventors: Gerhard Kloos, Erwitte (DE); Philip Stroop, Schloß Holte-Stukenbrock (DE); Benjamin Willeke, Paderborn (DE); Rimma Zhytnytska, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/823,934

(22) Filed: Sep. 4, 2024

(65) Prior Publication Data

US 2025/0084976 A1 Mar. 13, 2025

(30) Foreign Application Priority Data

Sep. 7, 2023 (DE) ......................... 102023124128.1

(51) Int. Cl.

| | |
|---|---|
| ***F21S 41/20*** | (2018.01) |
| ***F21S 41/151*** | (2018.01) |
| ***F21S 41/255*** | (2018.01) |
| ***F21S 41/26*** | (2018.01) |
| ***F21Y 115/10*** | (2016.01) |

(52) U.S. Cl.

CPC ........... *F21S 41/285* (2018.01); *F21S 41/151* (2018.01); *F21S 41/255* (2018.01); *F21S 41/26* (2018.01); *F21Y 2115/10* (2016.08)

(58) Field of Classification Search

CPC ...... F21S 41/285; F21S 41/151; F21S 41/255; F21S 41/26; F21S 41/24; F21Y 2115/10; F21Y 2105/10; F21Y 2105/14; F21Y 2105/16; F21Y 2103/10

See application file for complete search history.

(56) References Cited

U.S. PATENT DOCUMENTS 12,326,231 B2 * 6/2025 Gürtl .................. G02B 27/0018
2013/0021812 A1 * 1/2013 Schug ................... F21S 41/255 362/244

(Continued)

FOREIGN PATENT DOCUMENTS

DE 102018107214 A1 10/2019
DE 102020122896 A1 * 3/2022 ............ F21S 41/255

(Continued)

*Primary Examiner* — Erin Kryukova
(74) *Attorney, Agent, or Firm* — Husch Blackwell LLP

(57) ABSTRACT

A headlamp includes adjacent light sources. A collimator contains adjacent collimating lenses, each with an entry and an exit surface. A secondary optical element has at least one transparent substrate with an entry and an exit surface. Two sections are adjacent to one another on the substrate. An array of cylindrical lenses is placed in a first section, and there is no array of cylindrical lenses in a second section. The light emitted from one light source to pass successively through the entry and exit surfaces of one of the collimating lenses and then through one of the sections of the secondary optical element. An array of refractive structures is placed in the second section, each of which contains a prism on the entry and exit surfaces. The refractive structures cause the light exiting the collimator to pass successively through both prisms of one of the refractive structures.

18 Claims, 5 Drawing Sheets

(56) References Cited

U.S. PATENT DOCUMENTS

| | | | | |
|---|---|---|---|---|
| 2019/0299842 | A1* | 10/2019 | Franc | F21S 41/143 |
| 2019/0301699 | A1* | 10/2019 | Fischer | F21S 41/151 |
| 2023/0213161 | A1* | 7/2023 | Li | F21S 41/265<br>362/511 |
| 2023/0417384 | A1* | 12/2023 | Woo | F21S 41/143 |

FOREIGN PATENT DOCUMENTS

| | | | | | |
|---|---|---|---|---|---|
| DE | 102021122953 | B3 | | 12/2022 | |
| EP | 4015896 | A1 | * | 6/2022 | F21S 41/25 |

* cited by examiner

HEADLAMP FOR A MOTOR VEHICLE

CROSS REFERENCE

This application claims priority to German Application No. 102023124128.1, filed Sep. 7, 2023, the entirety of which is hereby incorporated by reference.

FIELD OF THE INVENTION

The present invention relates to a headlamp for a motor vehicle.

BACKGROUND OF THE INVENTION

This type of headlamp is disclosed in DE 10 2021 122 953 B3. The headlamp described therein contains numerous light sources that emit light when in use, a collimator with numerous collimating lenses, each of which has an entry surface and an exit surface through which the light from the light sources passes, and a secondary optical element with a transparent substrate populated with numerous arrays of cylindrical lenses through which the light exiting the collimator passes, in which the collimating lenses are in at least two rows, each of which has at least two collimating lenses that are adjacent to one another in a first direction, while the rows are adjacent to one another in a second direction that is perpendicular to the first direction. A first row of collimating lenses are dedicated to just one array of cylindrical lenses on the entry surface, and a second row of collimating lenses are dedicated to a first array of cylindrical lenses on the entry surface and a second array of cylindrical lenses on the exit surface.

A disadvantage with this design is that the exit surface of the secondary optical element visible from the street contains sections with cylindrical lenses and sections without cylindrical lenses, in which the sections of which without cylindrical lenses are flat, without any structuring. This means that structured and unstructured sections can be seen from the street, which has a negative impact on the appearance of the headlamp. When the unstructured sections of the exit surface are also dedicated to sections of the entry surface that do not have cylindrical lens arrays, the collimating lenses behind these unstructured sections are visible from the street, which further impacts the appearance of the headlamp.

BRIEF SUMMARY OF THE INVENTION

The fundamental problem addressed by the present invention is to create a headlamp like that specified above with an appearance that is not impacted by the unstructured sections of the exit surface of the transparent substrate.

An array of refractive structures is placed in the second section, each of which has a prism on the entry surface and a prism on the exit surface of the at least one substrate, with the refractive structures designed such that the light exiting the collimator passes successively through the two prisms of the refractive structures. Because of the prisms on the section of the exit surface of the transparent substrate without an array of cylindrical lenses, the exit surface has a comparatively homogenous appearance when viewed from the street. Furthermore, the collimating lenses behind the section without an array of cylindrical lenses can be at least partially concealed by the refractive structures.

The refractive structures can be designed such that they have little or no effect on the collimation of the light exiting the collimator. This means that the refractive structures have little or no effect on the lighting function that is to be obtained.

Each of the prisms can extend over part, in particular all, of the second section with a constant cross section. This means that the entire surface of the section without an array of cylindrical lenses is structured, resulting in an appearance that is similar to the section that has an array of cylindrical lenses.

The refractive structures can be adjacent to one another in a second direction that is perpendicular to the first, placed periodically in the second direction such that some or all of them are the same length and spaced apart evenly in this direction. This means that the entire section without an array of cylindrical lenses is structured in the second direction, resulting in an appearance that is similar to the section that has an array of cylindrical lenses.

The first direction can be horizontal and the second direction can be vertical when the headlamp has been installed in the vehicle.

The cylindrical lenses can be adjacent to one another in the first direction, such that the axes of the cylindrical lenses extend in the second direction. This vertical arrangement of the cylindrical axes results in a horizontal diffusion of the light passing through the substrate.

The prisms on the entry surface of the substrate can be offset to the prisms on the exit surface of the substrate in each of the refractive structures, in particular in the second direction. This results in a displacement of the beams exiting the collimator and passing through the prisms forming the refractive structure, in particular in the second direction. This has no effect on the collimation of the light passing through the substrate.

The refractive structures can be configured such that the light exiting the collimator and striking a prism on the entry surface of the substrate only exits the prism on the exit surface in the same refractive structure. This ensures that the light entering the prism on the entry surface of the substrate is not diffused in the transitions between adjacent prisms.

The cross section of the prism on the entry surface of the substrate can be point symmetric to the cross section of the prism on the exit surface of the substrate. This ensures that the change in direction of the light passing through the prism on the entry surface is reversed by the prism on the exit surface, such that the light passing through the substrate is only displaced, but does not change direction.

The edges of the prisms in the refractive structures can be rounded. This has advantages in the production of the substrate, e.g. when the substrate is made of plastic and obtained through injection molding. The radii of the roundings should be relatively small, however, to prevent glare.

The secondary optical element can have a transparent substrate, on which both the first section, containing the array of cylindrical lenses, and the second section, containing the refractive structures, are placed.

The secondary optical element can also have at least two transparent substrates, the first of which can have the array of cylindrical lenses, while the section with the refractive structures is placed on the second transparent substrate.

The secondary optical element can have numerous first sections, each of which has an array of cylindrical lenses. The secondary optical element can also have numerous second sections, each of which has an array of refractive structures.

A collimating lens and a first section, with an array of cylindrical lenses, or second section, with an array of refractive structures, can be dedicated to each light source, such that the light emitted by the light sources passes successively through their dedicated collimating lenses and the array of cylindrical lenses or array of refractive structures. This design results in the array of refractive structures completely concealing the collimating lenses to which they are dedicated.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
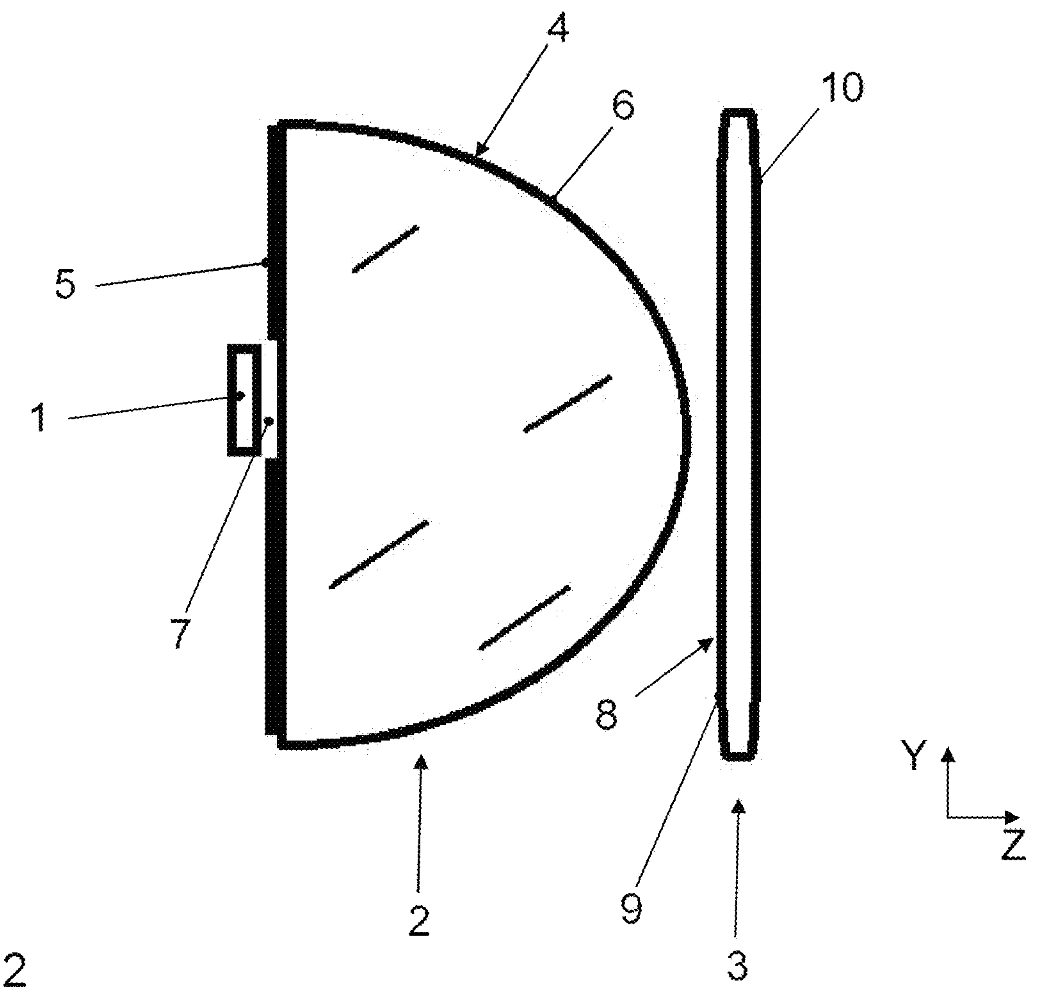
FIG. 1 shows a schematic side view of a headlamp obtained with the invention.

Identical or functionally identical parts have the same reference symbols in the drawings. A cartesian coordinate system is shown in each of the drawings for purposes of orientation.

Figure 2:
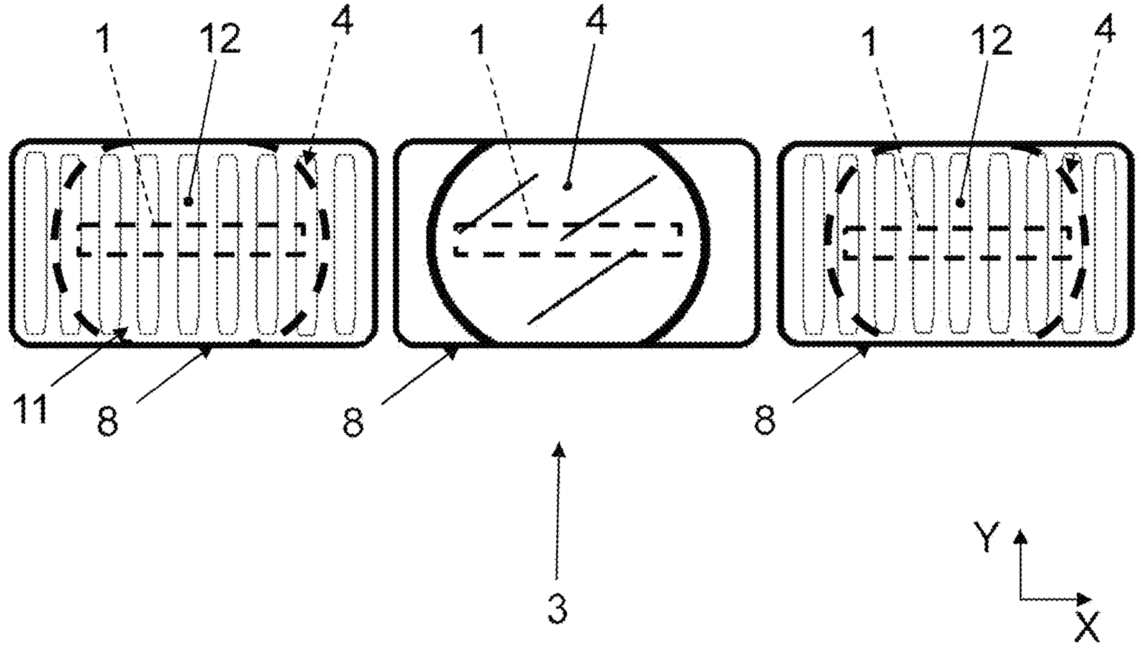
FIG. 2 shows a front view of the headlamp shown in FIG. 1, in which the refractive structures in the second section of the transparent substrate are not illustrated in order to show the collimating lenses that are behind them.

The headlamp shown in the drawings contains numerous light sources 1, a collimator 2, and a secondary optical element 3 (see FIGS. 1 and 2). Only one light source 1 is shown in FIG. 1. FIG. 2 depicts multiple light sources 1.

The light sources 1 are light-emitting diodes (LEDs) that emit light when the headlamp is in use. The light-emitting diodes can populate a single printed circuit board. By way of example, the headlamp can contain a row of light-emitting diodes. It can also contain more than one row of light-emitting diodes, e.g. two or three rows.

The light sources 1 are adjacent to one another and spaced apart in a first direction X. If there are numerous rows of light sources, these rows are adjacent to one another and spaced apart in a second direction Y, which is perpendicular to the first direction X. Sufficient spacing between the light-emitting diodes is thermally beneficial, such that the headlamp can be effectively cooled.

The first direction X is horizontal, and the second direction Y is vertical when the headlamp is installed in the vehicle. A third direction Z, which is perpendicular to the first and second directions X, Y, substantially corresponds to the main direction in which light is emitted from the light sources 1.

The embodiment of the collimator 2, shown merely schematically in FIG. 1, is a single piece that is placed such that at least some of the light emitted by the light sources 1 passes through it when the lighting device is in use. The collimator 2 shown in the drawings has just one row of three collimating lenses 4 (see FIG. 2), which are adjacent to one another in the first direction X.

If there is more than one row of light sources 1, the collimator 2 has more than one row of collimating lenses 4. The rows of collimating lenses 4 are then placed above one another, like the light sources 1, in the second direction Y.

There can also be more or less than three collimating lenses 4 in each row.

The collimating lenses 4 each have an entry surface 5 facing a light source 1, and an exit surface 6 on the other side (see FIG. 1). Each light source 1 has a dedicated collimator lens 4 in front of it, such that the light emitted by the light source 1 is substantially collimated by its collimating lens 4.

The collimating lenses 4 in the collimator 2 do not have to be integrally formed, and instead can be formed on separated substrates, which can be adjacent to one another in the first and/or second direction X, Y The collimator 2 can thus be subdivided into columns, lines, or rows in multiple substrates.

There is an aperture 7 on the entry surfaces 5 of the collimating lenses 4 between the light sources 1 and their collimating lenses 4 (see FIG. 1). The aperture 7 is formed by a hole in an opaque layer on the entry surface 5. This opaque layer can be applied to the entry surface through vapor deposition or painted thereon, and the hole can be formed with a laser beam.

The aperture 7 does not have to be formed on the entry surface 5, and instead can be a separate part placed between the light source 1 and the entry surface 5.

The lower edges of one, more, or all of the apertures 7 on the entry surfaces 5 of the collimating lenses 4 (see FIG. 1) can form a horizontal light/dark boundary in the light distribution in front of the motor vehicle obtained with the collimator 3 and the secondary optical element 3.

The secondary optical element 3 contains three transparent substrates 8. The secondary optical element 3 can also contain more or less than three transparent substrates 8. By way of example, the secondary optical element 3 can contain just one transparent substrate 8. In the embodiment shown in FIG. 2, the three transparent substrates are adjacent to one another in the first direction X.

The transparent substrates 8 each have an entry surface 9 facing the collimator 2 and an exit surface 10 on the other side. The two outer substrates 8 each form a first section of the secondary optical element 3. Each first section, or each of the outer substrates 8, has an array 11 of cylindrical lenses 12, which are adjacent to one another in the first direction X (see FIG. 2). The axes of the cylindrical lenses 12 extend in the second direction Y.

The arrays 11 of cylindrical lenses 12 can be placed on the exit surfaces 10, and the entry surfaces 9 of the outer substrates 8 can be flat. Arrays 11 of cylindrical lenses 12 can also be placed on both the entry surfaces 9 and exit surfaces 10.

When the headlamp is in use, at least part of the light exiting the collimator 2 passes through the arrays 11 of cylindrical lenses 12, and is diffused by them in the first direction X, i.e. horizontally.

The middle substrate 8 (see FIG. 2) forms a second section of the secondary optical element 3. This second section has an array 13 of refractive structures 14, each of which has a prism 15 on the entry surface 9, and a prism 16 on the exit surface 10 of the substrate 8 (see FIG. 3). The array 13 of refractive structures 14 is omitted in FIG. 2, merely to illustrate the placement of this collimating lenses 4 for this section.

Figure 3:
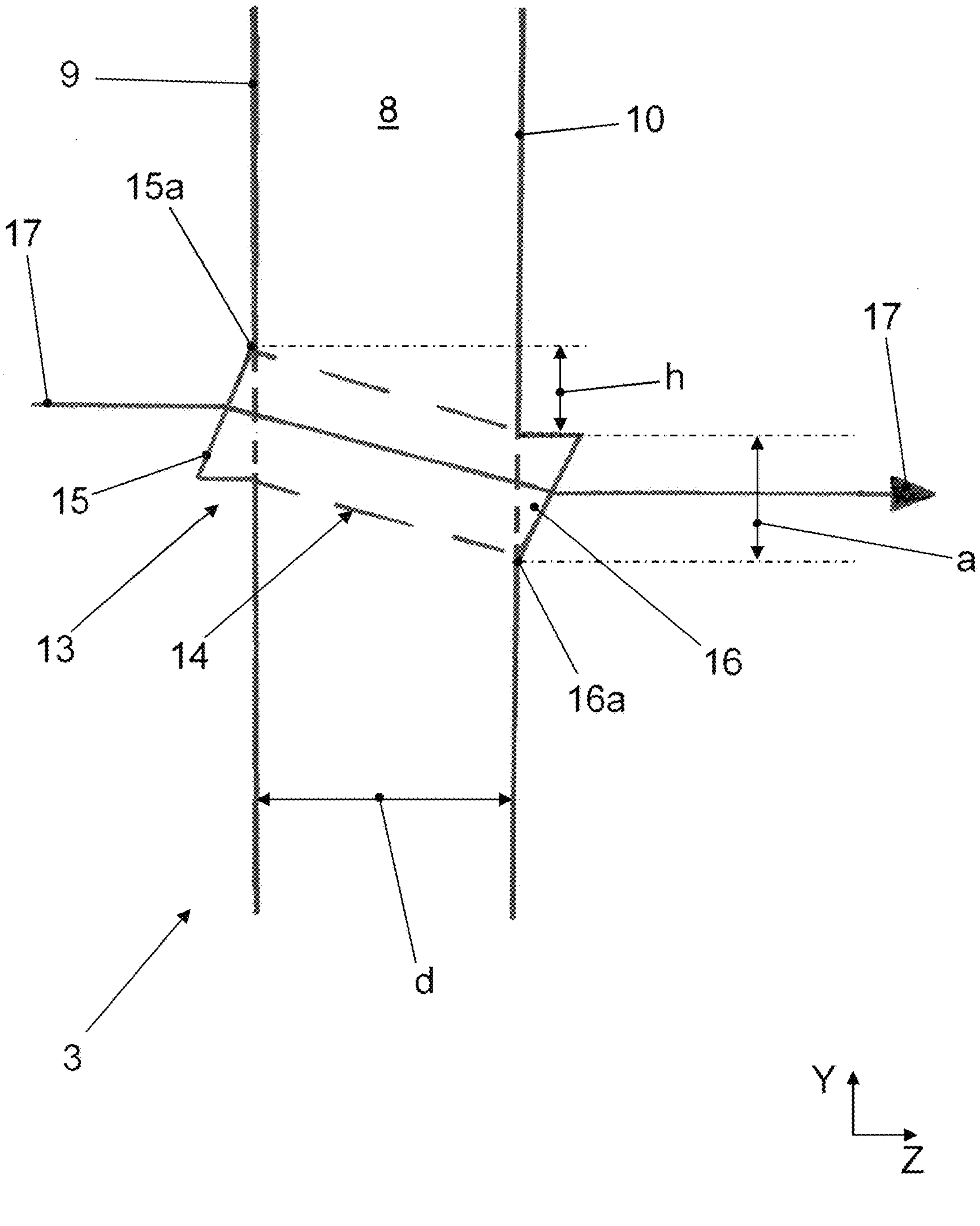
FIG. 3 shows a sectional view of a substrate of the secondary optical element in the headlamp shown in FIG. 1, with the beam paths for the light passing through the secondary optical element indicated schematically.
Figure 4:
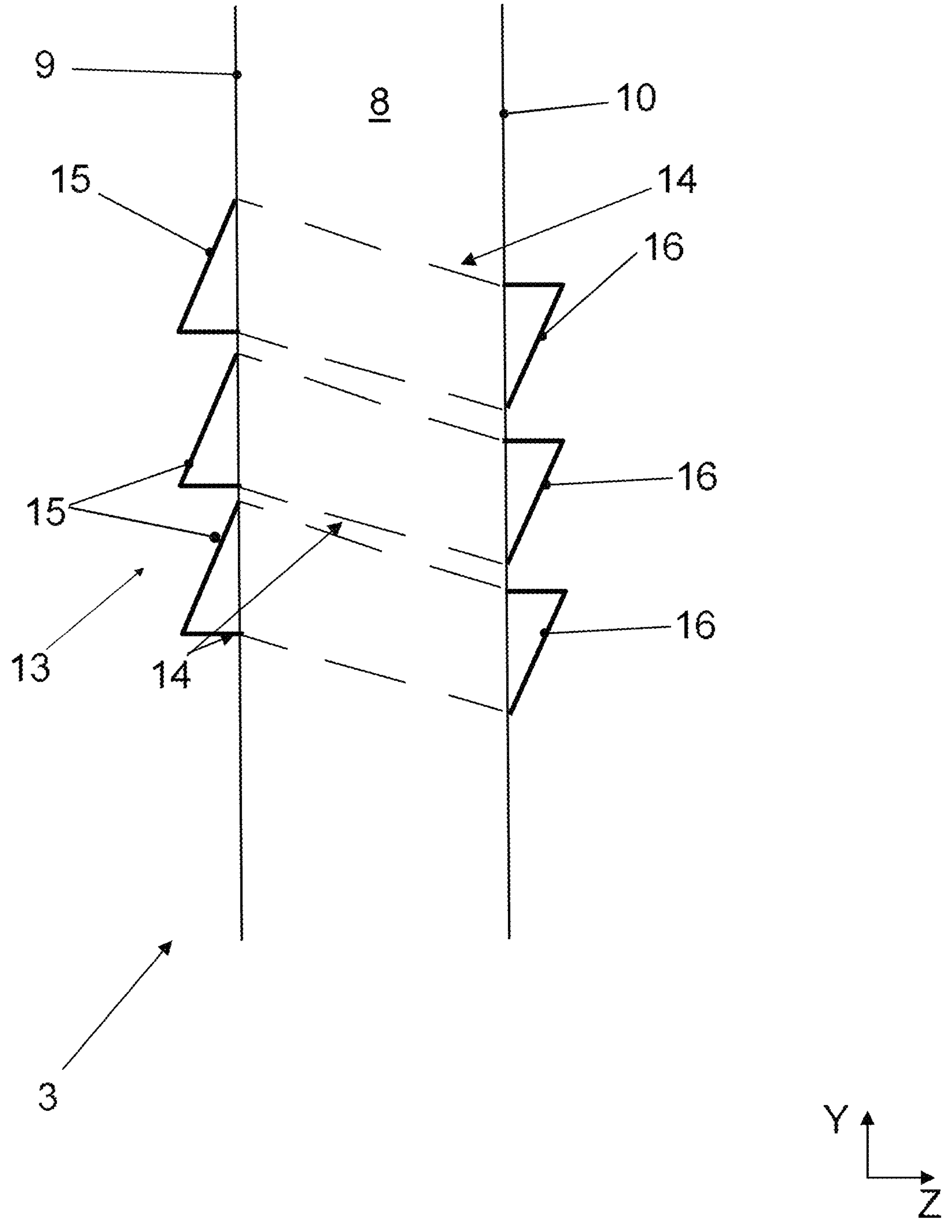
FIG. 4 shows another sectional view of a substrate of the secondary optical element in the headlamp shown in FIG. 1.
Figure 5:
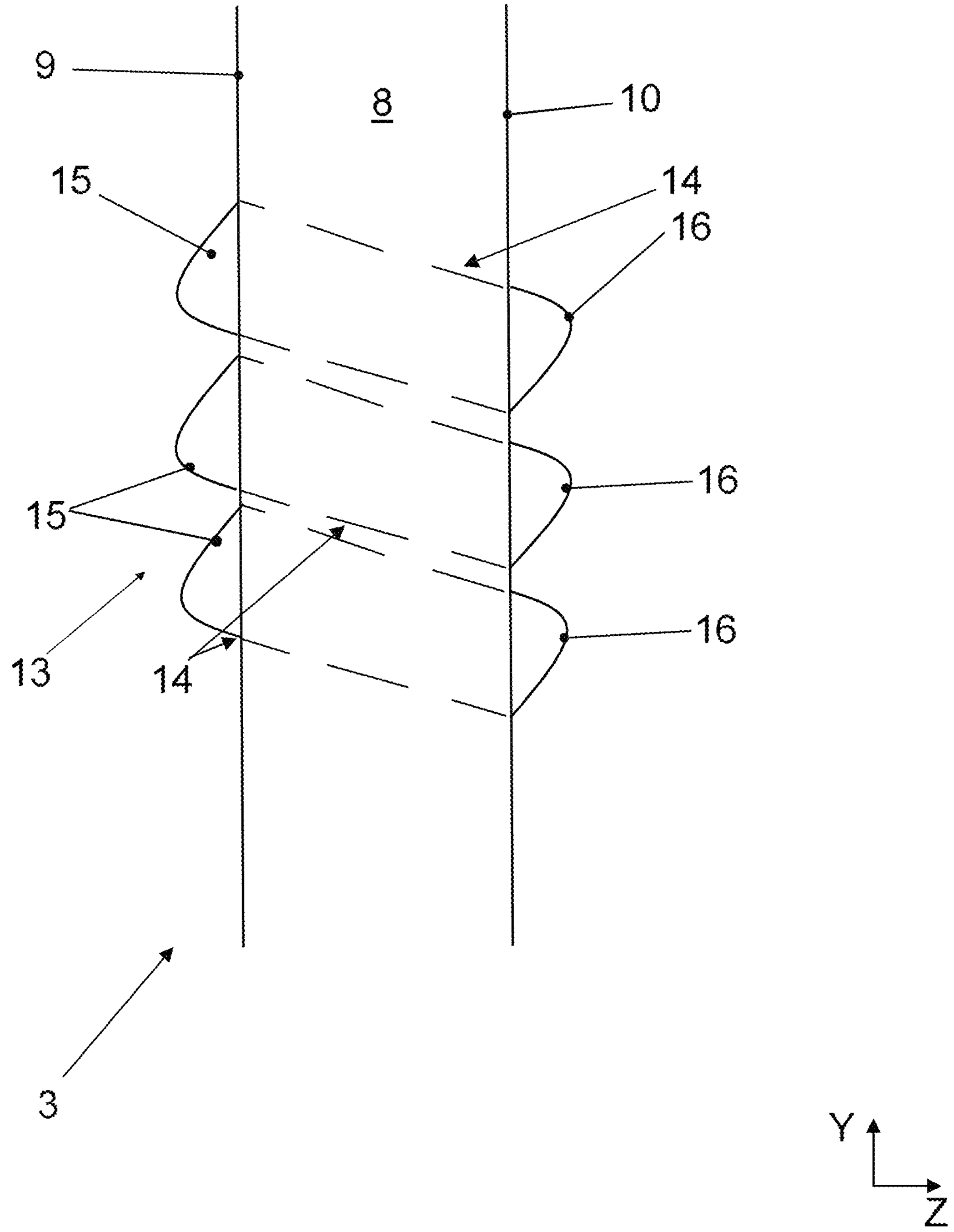
FIG. 5 shows another sectional view of a substrate of the secondary optical element in the headlamp shown in FIG. 1.

Just one of the refractive structures 14 is shown in FIG. 3. FIGS. 4 and 5 show multiple refractive structures 14 of the array 13. The refractive structures 14 of the array 13 are adjacent to one another in the second direction Y. These refractive structures 14 are placed periodically in the second direction Y such that the lengths of the structures 14 in second direction Y, and the spacings between adjacent structures 14 in the second direction Y are the same for numerous, preferably all, of the refractive structures 14.

The prisms 15, 16 of adjacent refractive structures can be directly adjacent to one another as shown, for example, in FIG. 3.

Figure 6:
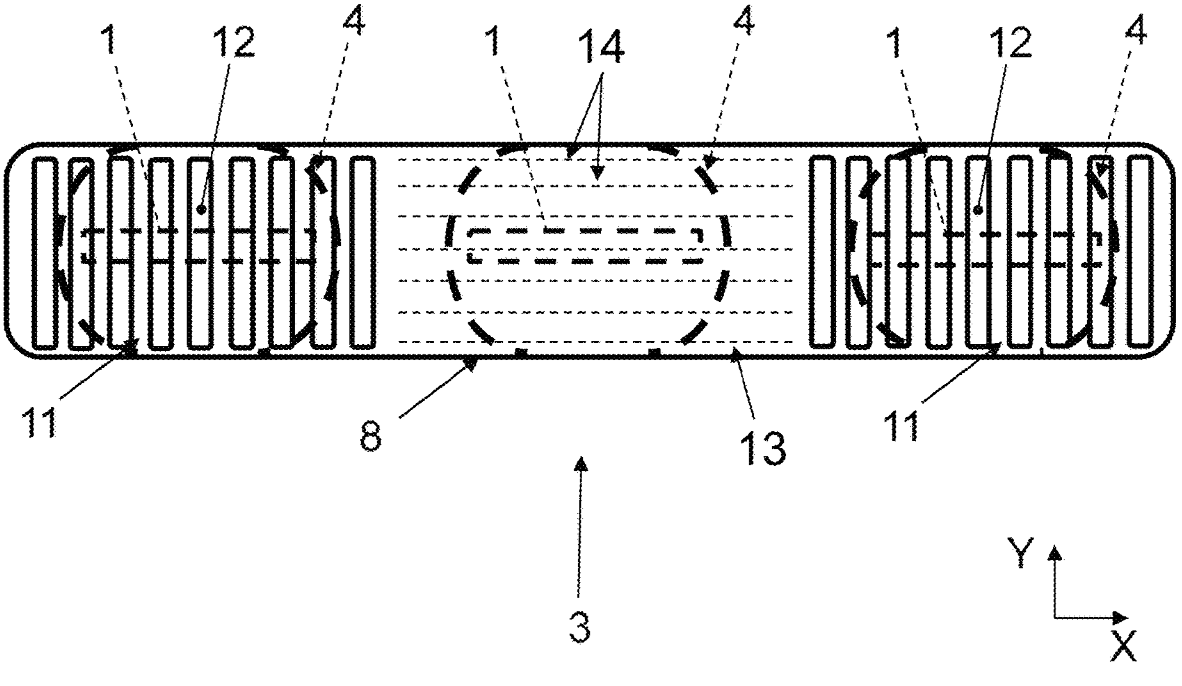
FIG. 6 shows a front view of an alternative example of the headlamp shown in FIG. 1, in which a secondary optical element includes one transparent substrate with first, outer sections including arrays of cylindrical lenses and a second, middle section including an array of refractive structures that are schematically illustrated in dash-dash lines.

Each prism 15, 16 extends over the second section in the first direction X, or into the drawing plane of FIG. 3, with a constant cross section. FIG. 6 shows an example of the refractive structures 14, and their respective prisms 15, 16, extending over the entire second section in the first direction X.

In each refractive structure 14, the cross section of the prism 15 on the entry surface 9 of the substrate 8 is point symmetric to the cross section of the prism 16 on the exit surface 10 of the substrate 8. The imaginary point of symmetry for this lies in a plane halfway between the entry surface 9 and the exit surface 10. Furthermore, in each of the refractive structures 14, the prism 15 on the entry surface 9 of the substrate 8 is offset in the second direction Y to the prism 16 on the exit surface 10 of the substrate 8 (see FIG. 3).

FIG. 3 shows that the light 17 exiting the collimator 2 is deflected downward by the prism 15 on the entry surface 9 of the substrate 8. Because of the point symmetric design of the prisms 15, 16, the light 17 is then deflected upward by the prism 16 on the exit surface 10 of the substrate 8, such that, after passing through the substrate 8, it continues to move in the same direction in which it was moving prior to entering the substrate 8, thus only being displaced slightly.

With an appropriate selection of the thickness d of the substrate 8, the vertical offset h of the prism 15 on the entry surface 9 of the substrate 8 to the prism 16 on the exit surface 10 of the substrate 8, and the height a of each prism 15, 16, the collimation of the light 17 exiting the collimator 2 remains unchanged, or is only altered insignificantly.

The prisms 15, 16 are designed such that the upper edge 15*a* of the prism 15 is flush with the entry surface 9, and the lower edge 16*a* of the prism 16 is flush with the exit surface 10.

The edges of the prisms 15, 16 in the refractive structures 14 can be rounded for production purposes. FIG. 5 shows an example of the prisms 15, 16 with rounded edges that are exaggerated for purposes of illustration.

LIST OF REFERENCE SYMBOLS

1 light source
2 collimator
3 secondary optical element
4 collimating lens
5 entry surface of the collimating lens
6 exit surface of the collimating lens
7 aperture
8 transparent substrate of the secondary optical element
9 entry surface of the transparent substrate
10 exit surface of the transparent substrate
11 array of cylindrical lenses
12 cylindrical lenses of the array
13 array of refractive structures
14 refractive structures of the array
15 prism on the entry surface of the transparent substrate
15*a* upper edge of the prism on the entry surface
16 prism on the exit surface of the transparent substrate
16*a* lower edge of the prism on the exit surface
17 light exiting the collimator
d thickness of the transparent substrate
h vertical offset of the prisms on the entry surface and exit surface
a height of the prisms

The invention claimed is:

1. A headlamp for a motor vehicle, the headlamp comprising:
- a plurality of light sources that emit light when in use, wherein the light sources are adjacent to one another in a first direction (X);
- a collimator including a plurality of collimating lenses, each of the collimating lenses having an entry surface and an exit surface, wherein the collimating lenses are adjacent to one another in the first direction (X);
- a secondary optical element that has having at least one transparent substrate with an entry surface and an exit surface, wherein two sections are adjacent to one another in the first direction (X) on the at least one substrate, wherein an array of cylindrical lenses is positioned in a first section of the two sections, and wherein there is no array of cylindrical lenses in a second section of the two sections;
- wherein the light emitted from one of the light sources passes successively through the entry surface and exit surface of one of the collimating lenses and then through one of the sections of the secondary optical element;
- wherein an array of refractive structures is positioned in the second section, wherein each refractive structure of the array of refractive structures includes a prism on the entry surface and a prism on the exit surface of the at least one substrate,
- wherein, for each refractive structure of the array of refractive structures, light exiting the collimator passes successively through both of the prisms of the refractive structure.

2. The headlamp according to claim 1, wherein the array of refractive structures is configured such that collimated light exiting the collimator remains collimated after passing through the array of refractive structures.

3. The headlamp according to claim 1, wherein, for each refractive structure of the array of refractive structures, both of the prisms extend over at least part of the second section in the first direction (X) with a constant cross section.

4. The headlamp according to claim 3, wherein, for each refractive structure of the array of refractive structures, both of the prisms extend over the entire second section in the first direction (X) with a constant cross section.

5. The headlamp according to claim 1, wherein the refractive structures are adjacent to one another in a second direction (Y) that is perpendicular to the first direction (X).

6. The headlamp according to claim 5, wherein the first direction (X) is horizontal and the second direction (Y) is vertical when the headlamp is installed in the vehicle.

7. The headlamp according to claim 6, wherein the cylindrical lenses in the array of cylindrical lenses are adjacent to one another in the first direction (X), and the axes of the cylindrical lenses extend in the second direction (Y).

8. The headlamp according to claim 5, wherein in each of the refractive structures, the prism on the entry surface of the substrate is offset to the prism on the exit surface of the substrate.

9. The headlamp according to claim 8, wherein the light exiting the collimator is displaced by the prisms of the refractive structures.

10. The headlamp according to claim 8, wherein in each of the refractive structures, the prism on the entry surface of the substrate is offset to the prism on the exit surface of the substrate in the second direction (Y).

11. The headlamp according to claim 5, wherein the refractive structures are placed periodically in the second direction (Y), such that the lengths of the structures in the second direction (Y) and spacings between adjacent structures in the second direction (Y) are the same for a plurality of the refractive structures.

12. The headlamp according to claim 1, wherein the light exiting the collimator that strikes a prism of one of the refractive structures on the entry surface of the substrate exits through the prism of the same one of the refractive structures on the exit surface of the substrate.

13. The headlamp according to claim 1, wherein in each refractive structure, the cross section of the prism on the entry surface of the substrate is point symmetric to the cross section of the prism on the exit surface of the substrate.

14. The headlamp according to claim 1, wherein edges of the prisms in the refractive structures are rounded.

15. The headlamp according to claim 1, wherein the secondary optical element has a transparent substrate on which both the first section, with the array of cylindrical lenses, and the second section, with the refractive structures, are positioned.

16. The headlamp according to claim 1, wherein the secondary optical element has at least two transparent substrates, wherein the first section, with the array of cylindrical lenses, is on the first transparent substrate, and wherein the second section, with the refractive structures, is on a second transparent substrate.

17. The headlamp according to claim 1, wherein the secondary optical element has numerous first sections, each of which has an array of cylindrical lenses.

18. The headlamp according to claim 1, wherein each light source has a dedicated collimating lens and a dedicated first section, with an array of cylindrical lenses, or a second section, with an array of refractive structures, such that the light exiting the light sources passes successively through the dedicated collimating lens and the dedicated array of cylindrical lenses or the dedicated array of refractive structures.

* * * * *